US011267553B2

(12) United States Patent
McNaught et al.

(10) Patent No.: US 11,267,553 B2
(45) Date of Patent: Mar. 8, 2022

(54) AEROFOIL STRUCTURES

(71) Applicant: AIRBUS OPERATIONS LIMITED, Bristol (GB)

(72) Inventors: Alan McNaught, Bristol (GB); German Ibanez-Gil, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 360 days.

(21) Appl. No.: 16/216,070

(22) Filed: Dec. 11, 2018

(65) Prior Publication Data

US 2019/0176960 A1 Jun. 13, 2019

(30) Foreign Application Priority Data

Dec. 13, 2017 (GB) .................................. 1720723

(51) Int. Cl.
*B64C 3/28* (2006.01)
*B64C 3/26* (2006.01)
(Continued)

(52) U.S. Cl.
CPC ................ *B64C 3/28* (2013.01); *B64C 3/185* (2013.01); *B64C 3/187* (2013.01); *B64C 3/26* (2013.01); *B64F 5/10* (2017.01); *B64C 2003/146* (2013.01)

(58) Field of Classification Search
CPC ........... B64C 3/28; B64C 3/185; B64C 3/187; B64C 3/26; B64C 2003/146;
(Continued)

(56) References Cited

U.S. PATENT DOCUMENTS 2,045,030 A * 6/1936 Thompson ............ F16C 23/045
384/210
2,445,399 A 7/1948 Johnson
(Continued)

FOREIGN PATENT DOCUMENTS

DE 102014102117 8/2015
EP 3243742 11/2017
(Continued)

OTHER PUBLICATIONS

Combined Search and Examination Report for GB1720723.4 dated Jun. 6, 2018, 9 pages.
(Continued)

*Primary Examiner* — Richard R. Green
*Assistant Examiner* — Madison Elizabeth Dittner
(74) *Attorney, Agent, or Firm* — Nixon & Vanderhye P.C.

(57) ABSTRACT

A kit of parts for forming an aerofoil structure including a torsion box for use in attaching a fixed leading or trailing edge structure to the torsion box, and a fixed leading or trailing edge structure attachable to the torsion box. The torsion box includes a first mounting feature. The fixed leading or trailing edge structure includes a second mounting feature configured to engage with the first mounting feature. The first mounting feature and the second mounting feature are mutually configured to permit the first and second mounting features to be moved into engagement with each other along a first direction, and to prevent relative movement of the first and second mounting features along a second direction when the first and second mounting features are engaged with each other.

16 Claims, 7 Drawing Sheets

(51) Int. Cl.
*B64F 5/10* (2017.01)
*B64C 3/18* (2006.01)
*B64C 3/14* (2006.01)

(58) Field of Classification Search
CPC ............. B64C 2203/00; B64C 2211/00; B64C 1/1446; B64F 5/10
USPC ........................................................ 244/124
See application file for complete search history.

(56) References Cited

U.S. PATENT DOCUMENTS

| | | | | |
|---|---|---|---|---|
| 3,002,717 A | * | 10/1961 | Pavlecka | B64C 3/26 244/124 |
| 4,399,970 A | * | 8/1983 | Evans | B64C 9/24 244/214 |
| 5,362,347 A | * | 11/1994 | Domine | B29C 66/72 156/212 |
| 6,834,830 B2 | * | 12/2004 | Fujino | B64C 3/28 244/35 R |
| 7,980,515 B2 | * | 7/2011 | Hunter | B64C 23/069 244/198 |
| 9,038,951 B2 | * | 5/2015 | Coulter | B64C 3/28 244/131 |
| 2003/0230670 A1 | | 12/2003 | Fujino | |
| 2005/0178925 A1 | | 8/2005 | Broadbent | |
| 2008/0156936 A1 | | 7/2008 | McBroom | |
| 2010/0065687 A1 | | 3/2010 | Douglas | |

FOREIGN PATENT DOCUMENTS

FR 2 776 983 10/1999
WO 2018/089583 5/2018

OTHER PUBLICATIONS

European Communication cited in EP 18 211 374.6 dated Nov. 18, 2020, 6 pages.

* cited by examiner

AEROFOIL STRUCTURES

RELATED APPLICATION

This application claims priority to United Kingdom Patent Application GB 1720723.4, filed Dec. 13, 2017, the entirety of which is incorporated by reference.

TECHNICAL FIELD

The present invention relates to a kit of parts for forming an aerofoil structure, relates to an aerofoil structure, and relates to a method for use in assembling an aerofoil structure.

BACKGROUND

Aerofoil structures are found in a variety of aircraft, spacecraft and wind turbine applications. They typically comprise a torsion box structure, which includes one or more longitudinal spars, a plurality of transverse ribs, and is enclosed by structural covers. A fixed leading edge (FLE) structure and/or a fixed trailing edge (FTE) structure may be attached to the torsion box structure. The assembly of the FLE, FTE and torsion box form an aerofoil shape.

When applied to aircraft wings and stabilizers, the torsion box is often referred to as the "wing box". A wing box construction used commonly in commercial airliners includes a front spar, a rear spar, an upper wing cover (skin) extending between the front spar and the rear spar, and a lower wing cover (skin) extending between the front spar and the rear spar. One or more wing box ribs may also be included between the spars and covers. Each of the front and rear spars may be formed as having, in cross section, a C-section (shape) with upper and lower flanges extending from an upstanding web. The upper and lower wing covers may be attached to the flanges of the front and rear spars. FTE and FLE structures of the wing, such as the leading edge having in cross section a D-shaped nose, may be supported by butt-straps attached to overhanging edges of the upper and lower covers.

The overall shape of the aerofoil structure fixed assembly must conform to a predefined shape to provide desired aerodynamic properties. Any misalignment of various members may result in a shape deviation, which when operated in an aerodynamic flow might result in unintended performance and handling qualities of the aerofoil structure. Therefore; the exact final position of the various members relative to one another in the assembled aerofoil structure (i.e. when fixed in an operational configuration) is of critical importance throughout the assembly process. Variations in the dimensions of the components of the aerofoil structure from an engineering ideal (normally governed by manufacturing drawings) must be controlled within pre-determined angular and linear dimension limits (commonly referred to as engineering tolerances).

Engineering tolerances can leave gaps between the mating surfaces of components, which must normally be rectified. The mating surfaces are often difficult to access once the components are held in an installed position, so rectifying tolerance gaps can be extremely time consuming and a significant factor affecting the rate at which finished aerofoil structures can be economically produced. Accordingly, there is a long felt need for an aerofoil structure design that enables a more efficient assembly process, for example by minimising engineering tolerances and/or facilitating the rectification of gaps caused by tolerances.

SUMMARY

A first aspect of the present invention provides a kit of parts for forming an aerofoil structure. The kit of parts comprises a torsion box and a fixed leading and/or trailing edge structure attachable to the torsion box. The torsion box comprises a first mounting feature. The fixed leading or trailing edge structure comprises a second mounting feature configured to engage with the first mounting feature. The first mounting feature and the second mounting feature are mutually configured to permit the first and second mounting features to be moved into engagement with each other along a first direction, and to prevent relative movement of the first and second mounting features along a second direction when the first and second mounting features are engaged with each other. The first direction is a substantially vertical direction, with respect to an intended operational orientation of the aerofoil structure and the second direction is a chordwise direction.

Optionally, the kit of parts further comprises a locking component for preventing disengagement of the second mounting feature from the first mounting feature. Optionally, the locking component is configured to prevent relative movement of the first and second mounting features along the first direction when the first and second mounting features are engaged with each other.

Optionally, the fixed leading or trailing edge structure comprises an outer skin having an opening, and wherein the opening is configured to permit access to the second mounting feature through the opening.

Optionally, the kit of parts further comprises a cover panel configured to close the opening. Optionally, the cover panel is configured such that the cover panel and the outer skin form a substantially smooth aerodynamic surface when the cover panel is closing the opening.

Optionally, the first mounting feature comprises a fitting fixedly attached to the torsion box. Optionally, the torsion box comprises a spar, and the fitting is fixedly attached to a web part of the spar and extends outwardly from the web part of the spar.

Optionally, the second mounting feature comprises a pin oriented to be substantially parallel to a major axis of the torsion box when the fixed leading or trailing edge structure is attached to the torsion box. Optionally, the pin is mounted to the fixed leading or trailing edge structure by a spherical bearing, such that the orientation of the pin relative to the fixed leading or trailing edge structure is adjustable. Optionally, the pin is mounted to a rib of the fixed leading or trailing edge structure.

Optionally, the fitting comprises a first interface surface defining a recess configured to receive the pin and to substantially prevent movement of the pin along the second direction when the pin is received in the recess. Optionally, the cross-sectional shape of the recess is configured to match the cross-sectional shape of the pin.

Optionally, if the kit of parts comprises a locking component, the locking component comprises a clamp plate. Optionally, the clamp plate comprises a second interface surface configured to cooperate with the first interface surface and an outer surface of the pin, when the pin is received in the recess of the first interface surface, to prevent movement of the pin away from the fitting along the first direction. Optionally, if the outer skin comprises an opening, the clamp plate is configured to be fastened to the fitting by fasteners accessible through the opening.

Optionally, the torsion box further comprises one or more further first mounting features and the fixed leading or trailing edge structure further comprises one or more further second mounting features. Optionally, the first mounting features are spaced along the torsion box in the spanwise direction according to a predetermined arrangement corresponding to an arrangement of the second mounting features on the fixed leading or trailing edge structure.

Optionally, the fixed leading or trailing edge structure comprises one or more systems for actuating a moveable device comprised in or mountable to the aerofoil structure.

Optionally, the fixed leading or trailing edge structure is of a modular design.

A second aspect of the present invention provides an aerofoil structure formed from the kit of parts according to the first aspect. Optionally, the aerofoil structure is an aircraft wing.

A third aspect of the present invention provides a method for use in assembling an aerofoil structure. The method comprises providing a torsion box comprising a first mounting feature positioned to correspond to a second mounting feature comprised in a leading or trailing edge structure of the aerofoil structure; and arranging the leading or trailing edge structure on the torsion box by engaging the second mounting feature with the first mounting feature. The first and second mounting features are mutually configured to permit the second mounting feature to be brought into engagement with the first mounting feature by moving the second mounting feature toward the first mounting feature along a first axis, and to substantially prevent relative movement of the first and second mounting features along a second axis when the second mounting feature is engaged with the first mounting feature.

Optionally, the method further comprises fixedly attaching the leading or trailing edge structure to the torsion box by locking the first and second mounting features in engagement with each other such that relative movement of the first and second mounting features along the first axis is substantially prevented.

Optionally, substantially all of the weight of the leading or trailing edge structure is supported by the first mounting feature, and optionally one or more further first mounting features comprised in the torsion box, during the step of fixedly attaching the leading or trailing edge structure to the torsion box.

Optionally, the fixed leading or trailing edge structure comprises an outer skin, and wherein locking the first and second mounting features in engagement with each other comprises accessing at least one of the first and second mounting features through an opening in the outer skin.

Optionally, the first axis is substantially vertical with respect to an intended operational orientation of the aerofoil structure, and the second axis is parallel to a chord of the aerofoil structure.

Optionally, the method comprises assembling a kit of parts according to the first aspect.

BRIEF DESCRIPTION OF THE DRAWINGS

Embodiments of the invention will now be described, by way of example only, with reference to the accompanying drawings, in which.

DETAILED DESCRIPTION

The examples described below relate to kits of parts for forming aerofoil structures, and aerofoil structures formed from such kits. Each example kit of parts comprises a torsion box and a fixed leading or trailing edge structure attachable to the torsion box. In each example the torsion box comprises a first mounting feature for use in attaching the fixed leading or trailing edge structure to the torsion box; and each fixed leading or trailing edge structure comprises a second mounting feature configured to engage with the first mounting feature. The first mounting feature and the second mounting feature are mutually configured to permit the first and second mounting features to be moved into engagement with each other along a first direction, and to prevent relative movement of the first and second mounting features along a second direction when the first and second mounting features are engaged with each other. Such arrangements of mounting features confer various advantages in relation to facilitating the assembly of an aerofoil structure, as will become clear from the following description.

Figure 1:
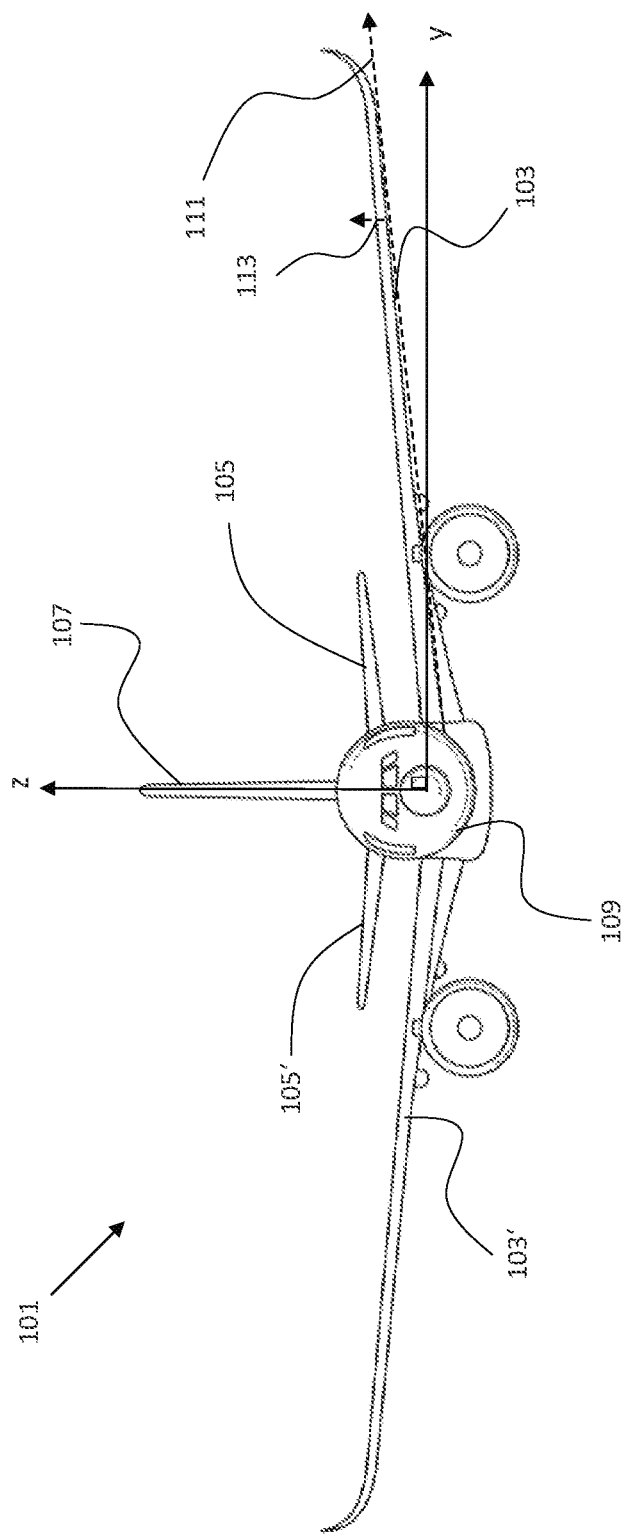
FIG. 1 shows a frontal schematic view of an aircraft.

FIG. 1 shows an example aircraft 101. The aircraft 101 comprises a pair of aerofoil structures 103, 103' in the form of wings, which extend approximately horizontally from a fuselage 109. Although only the wing 103 is described in detail, it may be assumed that the wing 103' has corresponding features. A further pair of aerofoil structures 105, 105' in the form of horizontal tail planes extend approximately horizontally from either side of a rear portion of the fuselage 109. Yet a further aerofoil structure 107 in the form of a vertical tail plane extends vertically from an upper rear portion of the fuselage 109.

The aircraft 101 has a set of orthogonal aircraft axes 201. The longitudinal axis (x) has its origin at the centre of gravity of the aircraft 101 and extends lengthwise through the fuselage 109 from the nose to the tail in the normal direction of flight. The lateral axis or spanwise axis (y) also has its origin at the centre of gravity and extends substantially crosswise from wing tip to wing tip. The vertical or normal axis (z) also has its origin at the centre of gravity and passes vertically through the centre of gravity. A further pair of orthogonal axes is defined for the aerofoil structure 103; a first aerofoil axis 111 that is defined by a major dimension of a web of a front spar 314 (see FIG. 3), and an orthogonal second aerofoil axis 113 defined by a minor dimension of the web of the front spar 314.

Figure 2:
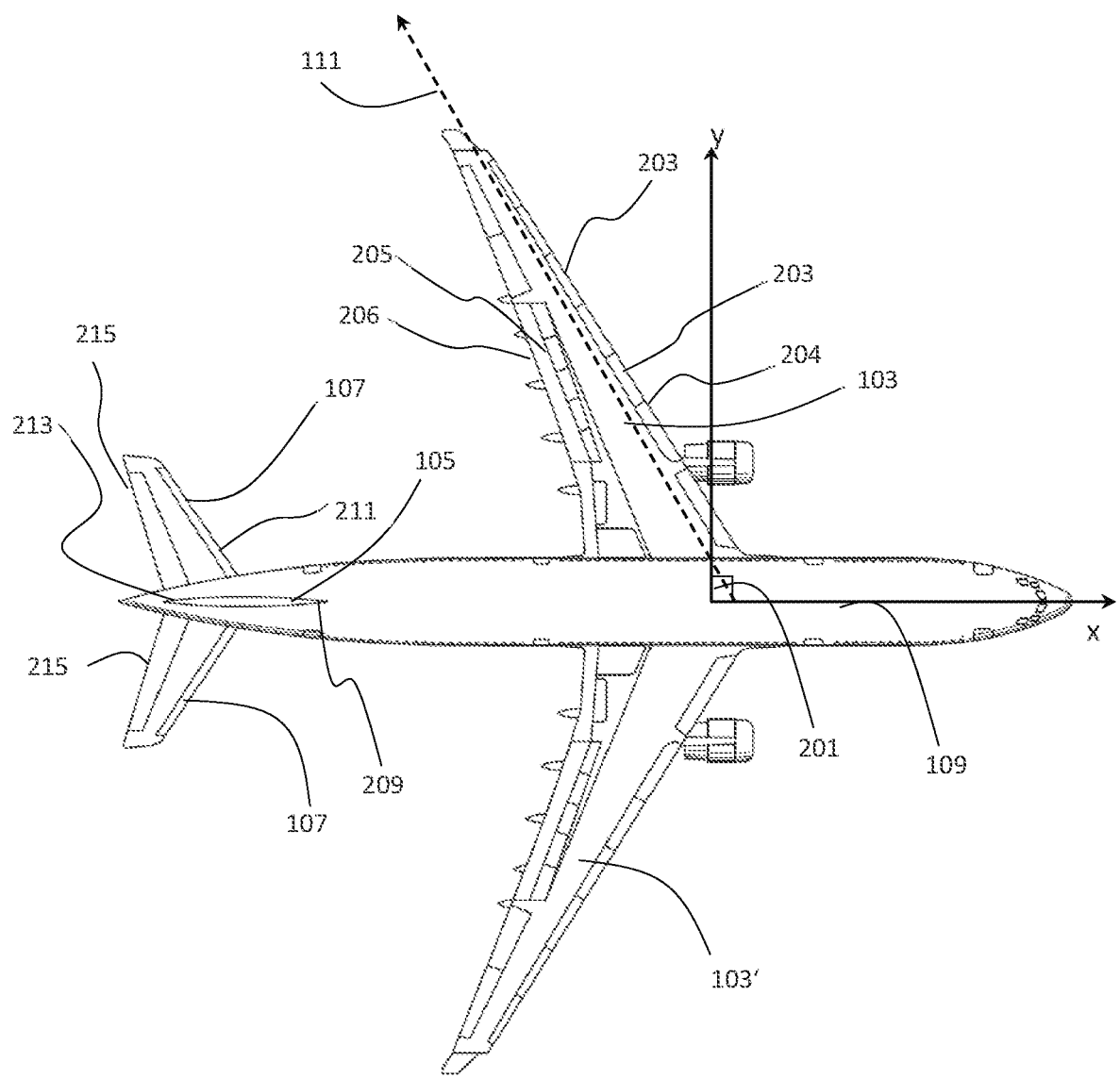
FIG. 2 shows a top schematic view of the aircraft of FIG. 1.

As can be seen from FIG. 2, the aerofoil structure 103 comprises a set of high-lift devices called leading edge slats 203, which are mechanically connected to it at the leading edge region 204. The aerofoil structure 103 also comprises a set of high-lift devices called trailing edge flaps 205, which are mechanically connected to it at the trailing edge region 206. The slats 203 and flap 205 are moveable (i.e. non-fixed) devices, being actuatable during operation between a fully deployed position and a fully retracted position according to the inputs of a pilot. The purpose of the slats 203 and flaps 205 is to increase the camber and chord length and overall surface area of the wing 103 when deployed, thereby increasing the coefficient of lift that the wing 103 produces when required for slow flight of the aircraft 101. Adjacent to each slat 203 or flap 205 and/or in the areas where no high-lift devices are provided, the leading edge and trailing edge structure of the aerofoil structure 103 is fixed i.e. not configured to be moveable like the slats 203 and flaps 205 during operation of the aircraft 101. Each of the vertical tail plane 109 and the horizontal tail planes similarly comprises a leading edge 209, 211, a trailing edge 213, 215, and fixed structure.

Figure 3:
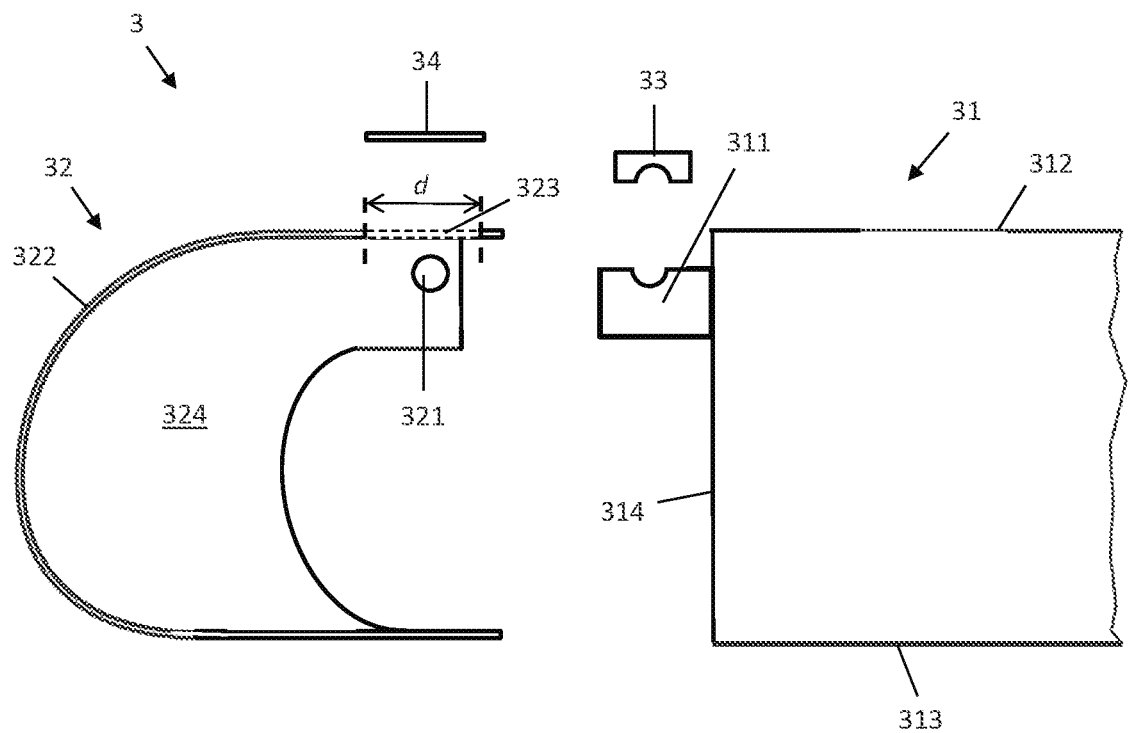
FIG. 3 shows a schematic cross-section through an example kit of parts according to the invention.

Any of the aerofoil structures comprised in the aircraft 101 may be formed from a kit of parts according to the invention. FIG. 3 shows an example kit of parts 3 for forming an aerofoil structure, such as any of the aerofoil structures of the aircraft 101. The kit of parts 3 comprises a torsion box 31 and a fixed leading or trailing edge structure 32.

The torsion box 31 comprises an upper cover 312, a lower cover 313, a front spar 314, and a rear spar (not shown). In certain examples any two or more of the components of the torsion box 31 may be formed integrally as a unitary member. For example, the front spar 314 may be formed integrally with the upper cover 312. The front spar 314 has an upstanding web (which may be substantially, or close to, vertical in an operational orientation of the aerofoil) which defines a first aerofoil axis, as discussed above. The upper and lower covers 312, 313 may be substantially, or close to, perpendicular to the web of the front spar 314. The details of the structure of the torsion box 31 are not shown in FIG. 3, as the torsion box 31 may have any suitable construction (various such constructions are known in the art).

In the illustrated example the fixed leading or trailing edge structure 32 is a leading edge structure in the form of a D-nose, although in other examples it may be a trailing edge fixed structure, or a different form of leading edge fixed structure. The example leading edge structure 32 may be provided as a modular assembly, that is, a unitary preassembled structural module (hereinafter referred to as a modular leading edge structure). The leading edge structure 32 may also be pre-equipped with systems and/or actuation elements for one or more moveable devices which are to be mounted on the completed aerofoil structure. Such a moveable device may be, for example, a slat, a Krueger, or the like. In examples in which the fixed leading or trailing edge structure is a trailing edge structure, such a moveable device may be, for example, a flap, an aileron, a spoiler, or the like. The use of pre-assembled unitary leading or trailing edge modules is desirable because it allows tolerance gaps to be controlled between a reduced number of components, which reduces the time overall required to assemble an aerofoil structure.

The fixed leading edge structure 32 comprises an outer skin 322 fixedly attached to at least one leading edge rib 324, by any suitable mechanism. In some examples the outer skin 322 comprises one or more pieces of aluminium sheet (or any composite material) and is bonded to a flange of the leading edge rib 324 such that it defines a desired aerodynamic shape of the leading edge of the completed aerofoil structure. The leading edge rib 324 may be formed from composite material, or any other suitable material e.g. aviation grade aluminium alloy. The fixed leading edge structure 32 may comprise any number of leading edge ribs 324. In some examples, the fixed leading edge structure 32 may comprise one or more pairs of ribs 324, where the spanwise spacing between ribs 324 in a given pair is significantly smaller than the spanwise spacing between a rib 324 in the given pair and the closest rib 324 not in that pair. The details of the structure of the rib 324 are not shown in FIG. 3, as the rib 324 may have any suitable construction (various such constructions are known in the art).

The torsion box 31 comprises a first mounting feature 311 for use in attaching the fixed leading edge structure 32 to the torsion box 31. The fixed leading edge structure 32 comprises a second mounting feature 321 configured to engage with the first mounting feature 311. The first mounting feature 311 and the second mounting feature 321 are mutually configured to permit the first and second mounting features 311, 321 to be moved into engagement with each other along a first direction, and to prevent relative movement of the first and second mounting features along a second direction when the first and second mounting features 311, 321 are engaged with each other. The first and second directions may, in some examples, be substantially (or close to) orthogonal. The first direction may be a substantially vertical direction with respect to an intended operational orientation of the aerofoil structure. The second direction may be a chordwise direction. In the illustrated example the first direction is substantially (or close to) parallel with a second aerofoil axis of the aerofoil structure, and the second direction is substantially (or close to) parallel with a chordwise axis of the aerofoil structure. The first mounting feature 311 and the second mounting feature 321 may be mutually configured to prevent relative movement of the first and second mounting features along all directions having a component parallel to a chordwise axis of the aerofoil structure when the first and second mounting features 311, 321 are engaged with each other.

The first mounting feature 311 may comprise a protruding feature which extends outwardly from the web of the front spar 314. The first mounting feature 311 may be formed integrally with the front spar 314, or may be fixedly attached to the front spar 314. The first mounting feature may comprise a bracket, a fitting, or any other component or formation suitable for engaging with the second mounting feature and capable of supporting the at least a substantial part of the weight of the fixed leading edge structure 32. The second mounting feature may additionally be capable of transmitting to the torsion box 31 a substantial part of the load expected to be experienced by the fixed leading edge structure 32 during operation of the aerofoil structure. The second mounting feature 321 may be formed integrally with a component (e.g. a rib 324) of the fixed leading edge structure 32, or may be fixedly attached to a component of the fixed leading edge structure 32. The second mounting feature may comprise a bracket, a fitting, a pin, or any other component or formation suitable for engaging with the first mounting feature 311.

In some examples the first mounting feature 311 and the second mounting feature 321 are mutually configured such that the fixed leading edge structure 32 is able to pivot, at least by a small amount, relative to the torsion box 31 when the first and second mounting features 311, 321 are engaged with each other. In the illustrated example of FIG. 3, the second mounting feature comprises a spanwise extending pin, and the first mounting feature comprises a fitting having an upper surface (an interface surface) which defines a spanwise extending recess configured to receive a lower part of the pin. The recess is configured to substantially prevent movement of the pin along the second direction when the pin is received in the recess. The cross-sectional shape of the recess may be configured to match the cross-sectional shape of the pin. The pin is mounted to a rib 324 and is oriented to be substantially parallel to a major axis of the torsion box when the fixed leading or trailing edge structure is attached to the torsion box. The fitting is able to support and retain the pin when the fixed leading edge structure 32 is arranged on the torsion box 31 such that the pin is in the recess, and thereby the fixed leading edge structure is supported and retained in an operational position without the need for a jig to be used to hold it in place during a process of fixedly attaching the fixed leading edge structure 32 to the torsion box 31. This may advantageously facilitate assembly of the kit of parts 3 into the aerofoil structure.

The kit of parts 3 further comprises a locking component 33 for preventing disengagement of the second mounting feature 321 from the first mounting feature 311. The locking component 33 is configured to prevent relative movement of the first and second mounting features 311, 322 along the first direction when the first and second mounting features are engaged with each other. In the particular illustrated example, the locking component 33 comprises a clamp plate having a lower surface (interface surface) shaped to receive an upper part of the pin, and to abut an upper surface of the fitting such that the pin is enclosed between the fitting and the clamp plate. The interface surface of the clamp plate cooperates with the interface surface of the fitting to constrain movement of the pin. In particular, the interface surface defines a recess configured to receive an upper part of the pin. The cross-sectional shape of the recess may be configured to match the cross-sectional shape of the pin. The clamp plate prevents movement of the pin away from the fitting in the second direction. Movement of the pin relative to the fitting in any direction other than parallel to the pin axis is substantially prevented by the recess of the fitting in combination with the recess of the clamp plate. It may be desired to also substantially prevent axial movement of the pin relative to the fitting when the pin is engaged with the fitting, in which case the pin and or the fitting may comprise any suitable formation (such as one or more pin sections having a greater diameter than the diameter of the hole formed by the recesses of the fitting and the clamp plate).

The locking component 33 is fixedly attachable to the first mounting feature 311 by any suitable mechanism, such as using fasteners. In some examples the locking component 33 is fixedly attachable to the first mounting feature 311 by an attachment mechanism which can be applied/activated without requiring access to a lower side of the first and second mounting features 311, 321. The locking component 33 is to be attached to the first mounting feature 311 when the second mounting feature 321 is engaged with the first mounting feature 311. To enable access to the locking component 33 when it is in a locking position with respect to the first and second mounting features 311, 321, the outer skin 322 comprises an opening 323. The opening 323 is configured to permit access to the second mounting feature through the opening. When the fixed leading edge 32 is arranged on the torsion box 31 such that the first and second mounting features 311, 321 are engaged, the opening 323 may permit access to both the first mounting feature 311 and the second mounting feature 321. In some examples the spanwise width d of the opening 323 is similar to the distance by which the first mounting feature 311 protrudes from the web of the spar 314. In some examples the opening 323 is large enough to permit the locking component 33 to pass through the opening 323.

Although FIG. 3 shows the locking component 33 as separate from the torsion box 31 and the fixed leading edge structure 32, in some examples the locking component 33 may be integrated with one or the other of the torsion box 31 and the fixed leading edge structure 32. In some examples the locking component 33 may be integrated with one or the other of the first and second mounting features 311, 321. For example, the locking component may be moveably attached to one or the other of the torsion box 31 and fixed leading edge structure 32, and/or moveably attached to one or the other of the first and second mounting features 311, 321. The locking component 33 may be moveable relative to a component to which it is attached between an open configuration, in which it is possible to move the first and second mounting features 311, 321 into or out of engagement with each other, and a closed configuration in which it is not possible to move the first and second mounting features 311, 321 into or out of engagement. In some examples such a moveable attachment may comprise a hinged connection between the locking component 33 and the component to which it is attached.

The kit of parts 3 further comprises a cover panel 34 configured to close the opening 323. The cover panel 34 and the outer skin 322 of the fixed leading edge structure 32 form a substantially smooth aerodynamic surface when the cover panel 34 is closing the opening. The size and shape of the cover panel 34 (in the plane of the outer skin 322) may be substantially equal to the size and shape of the opening 323. The cover panel 323 may be formed from the same material as the outer skin 322, or it may be formed from a different material. The cover panel 34 may be attachable to the fixed leading edge structure 32 by any suitable mechanism, such as fasteners, such that the cover panel 34 is securely retained on the fixed leading edge structure 32 during operation of the aerofoil. The attachment mechanism may be releasable and/or replaceable, to permit the cover panel 34 to be removed and subsequently replaced, during the operational life of the aerofoil. This may advantageously facilitate removal and subsequent replacement of the fixed leading edge structure 32 from the torsion box 31, e.g. to perform maintenance operations on the fixed leading edge structure 32 or systems housed therein.

In some examples, the fixed leading edge structure 32 is attached to the torsion box 31 at multiple spanwise locations. In such examples, the torsion box 31 may comprise one or more further first mounting features (not shown) and the fixed leading edge structure 32 may comprise one or more further second mounting features (not shown). The further first mounting features may be of the same design as the first mounting feature 311 described above, and the further second mounting features may be of the same design as the second mounting feature 321 described above. Furthermore, a locking component of the same design as the locking component 33 may be associated with each pair of corresponding further first and second mounting features. Each pair of corresponding further first and second mounting features may be associated with an opening of the same or similar design to the opening 323, and a cover panel to close that opening. In some examples, a single opening in the outer skin 322 may be associated with (i.e. may provide access to) more than one second mounting feature.

The first mounting features 311 are spaced along the torsion box 31 in the spanwise direction according to a predetermined arrangement corresponding to an arrangement of the second mounting features on the fixed leading edge structure 32. The spacing of the first mounting features 311 may be relatively large compared with the spacing between adjacent fasteners used to attach a leading edge structure to a conventional wing box. The spacing of the first mounting features 311 (and/or the spacing of corresponding second mounting features 321 on the fixed leading edge structure 32) may be selected based on properties of the leading edge structure 32 and/or properties of the torsion box 31 For example, the spacing of the first and or second mounting features 311, 321 may be selected based on the stiffness of the fixed leading edge structure 32 and/or the stiffness of the torsion box 31, so as to avoid the creation of steps or gaps in the aerodynamic surface of the aerofoil structure when loaded. Typically, the stiffer the fixed leading edge structure 32 and torsion box 31, the fewer mounting features will be required in order to maintain a smooth aerodynamic surface during flight.

As mentioned above, the fixed leading edge structure 32 comprises a plurality of ribs 324. A second mounting feature 321 may be attached to (that is, mounted on or formed integrally with) each of the ribs 324. Alternatively, a second mounting feature 321 may be attached to some but not all of the ribs 324 of the fixed leading edge structure 32. Systems for actuating moveable devices mounted on the fixed leading edge structure are typically attached to a pair of ribs 324 which are relatively closely spaced in the spanwise direction. For such rib pairs, each rib of the pair may have a second mounting feature 321 attached to it.

FIGS. 4a-d show a specific example kit of parts 4 according to the invention, and FIGS. 5a-d show a leading edge part of an example aerofoil structure 5 which has been assembled from the kit of parts 4. The aerofoil structure 5 is an aircraft wing, for example of the aircraft 101 shown in FIGS. 1 and 2. The kit of parts 4 comprises a torsion box 41 having a plurality of first mounting features 411, such as mounting brackets, arranged in a spanwise row along a front face of a front spar 414 of the torsion box 41. The kit of parts 4 also comprises a fixed leading edge structure 42 having a pair of ribs 424, each of which is associated with a second mounting feature 421. The fixed leading edge structure 42 also has an outer skin, however this outer skin is omitted from FIGS. 4a-d for the sake of clarity. The torsion box 41 and the fixed leading edge structure 42 may have any or all of the same features as the corresponding parts of the example kit of parts 3 described above, except where explicitly stated otherwise in the following description.

Figure 4A:
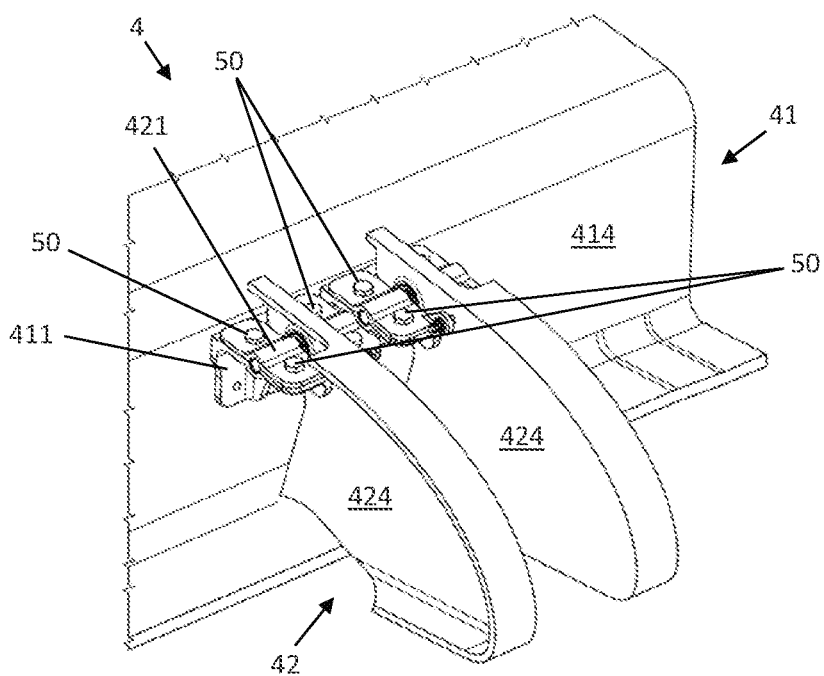
FIGS. 4a-d are various views of a further example kit of parts according to the invention.
Figure 4B:
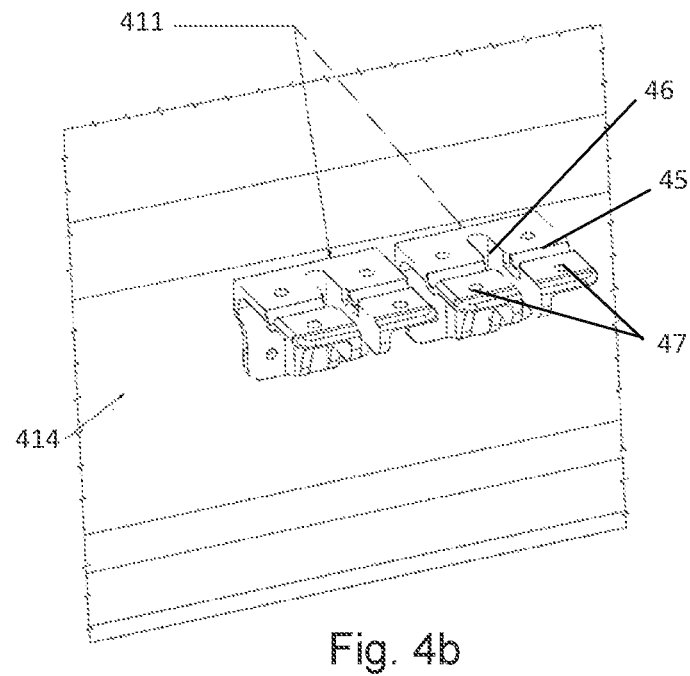
Figure 4C:
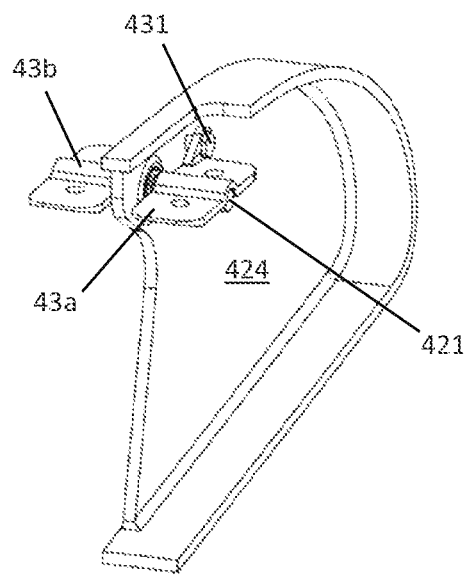

FIG. 4a shows the kit of parts 4 in a partially assembled state in which each first mounting feature 411 is engaged with each corresponding second mounting feature 421 and the engagement is locked by respective locking components in the form of clamp plates 43a, 43b, as will be described in more detail below. The clamp plates 43a, 43b are fixedly attached to the fittings 411 by fasteners 50. FIG. 4b shows the spar 414 and first mounting features 411 of the torsion box 41 in isolation. FIG. 4c shows a rib 424 and associated second mounting feature 421 and clamp plates 43a, 43b in isolation, and FIG. 4d is an exploded view of the rib 424 of FIG. 4c, which shows the constructional details of the second mounting feature 421 and clamp plates 43a, 43b.

With reference to FIG. 4b, it can be seen that each first mounting feature 411 comprises a fitting fixedly attached (e.g. by bolts) to the forward-facing surface of the web of the front spar 414. Each fitting has a substantially horizontal (with respect to an intended operational orientation of the aerofoil structure 5) interface surface which defines a recess 45. Each recess 45 is coaxial, and extends parallel to a major axis of the front spar 414. Fastener holes 47 extend into the interface surface of each first fitting 411, to facilitate the attachment of clamp plates 43a, 43b. A slot 46 is formed in each interface surface, in a direction perpendicular to direction of extension of the recess. Each recess is bisected by the respective slot 46. The purpose of the slots 46 is to accommodate the structure of a rib 424 when the second mounting features 421 are engaged with the first mounting features 411 (that is, when the fixed leading edge structure 42 is arranged on the torsion box 41).

Figure 4D:
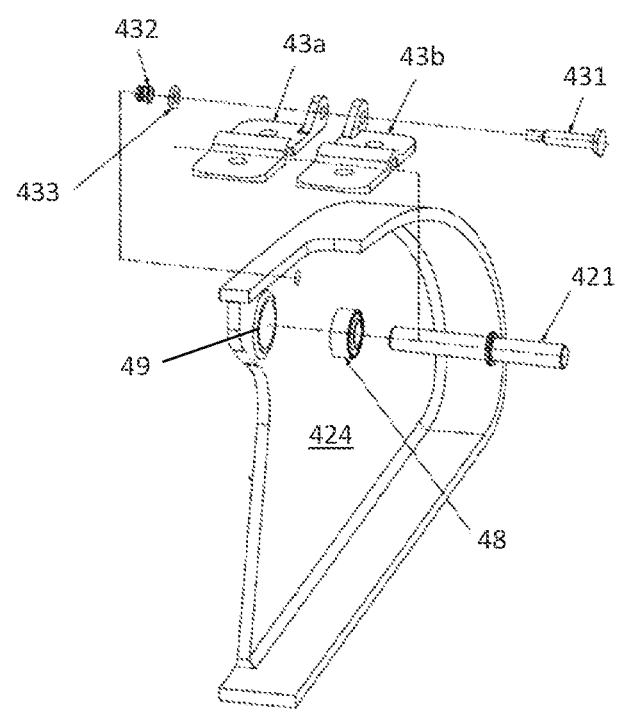

With reference to FIGS. 4c and 4d, it can be seen that the second mounting feature 421 associated with the illustrated rib 424 is in the form of a pin 421, which extends through a bore 49 formed in the rib 424. The pin 421 is mounted in the bore 49 by means of a spherical bearing 48. The spherical bearing 48 acts as an angular compensator to compensate for an angular tolerance gap between the fixed leading edge structure 42 and the torsion box 41 at the location of the rib 324. It should be appreciated that any suitable alternative to the above types of angular compensator may be used e.g. a set of spherical washers may be used instead and may be installed at each side of the rib 324. The second mounting feature 421 associated with the other rib 324 of the rib pair shown in FIG. 4a has the same design as the second mounting feature 421 shown in FIGS. 4c and 4d.

In the particular example shown in FIGS. 4a-d, a locking component is integrated with each second mounting feature 421. Each locking component is in the form of a left-hand clamp plate 43a and a right-hand clamp plate 43b. Each clamp plate 43a, 43b comprises a lower interface surface which defines a recess having substantially the same configuration as the recesses 45 of the fittings 411. The left-hand clamp plates 43a are mirror-images of the right-hand clamp plates 43b, although this need not be the case in all examples. The recesses of the clamp plates 43a, 43b are coaxial with each other, and with the pin 421. Fastener holes extend through each clamp plate 43a, 43b, to facilitate the attachment of the clamp plates 43a, 43b to a corresponding fitting 411. The location of the fastener holes in the clamp plates 43a, 43b corresponds to the locations of the fastener holes 47 in the corresponding fitting 411.

As can be seen from FIGS. 4c and 4d, each pair of clamp plates 43a, 43b associated with a given second mounting feature 421 is attached to the rib 424 with which that second mounting feature is associated, by a bolt 431, washer 433, and nut 432. This attachment mechanism maintains the clamp plates 43a, 43b in a locking position with respect to the pin 421, in which an upper part of the pin 421 is received in the recesses of the clamp plates 43a, 43b. It will be appreciated that with the clamp plates 43a, 43b maintained in this position, it is possible to place the lower part of the pin 421 into the recesses of the corresponding fitting 411 by moving the fixed leading edge structure 42 vertically with respect to the torsion box 41. To facilitate engagement of the pin 421 with the recesses 47 of the corresponding fitting 411, some degree of rotational movement of the clamp plates 43a, 43b may be permitted. The clamp plates 43a, 43b associated with the other rib 324 of the rib pair shown in FIG. 4a have the same design as the clamp plates 43a, 43b shown in FIGS. 4c and 4d.

Figure 5A:
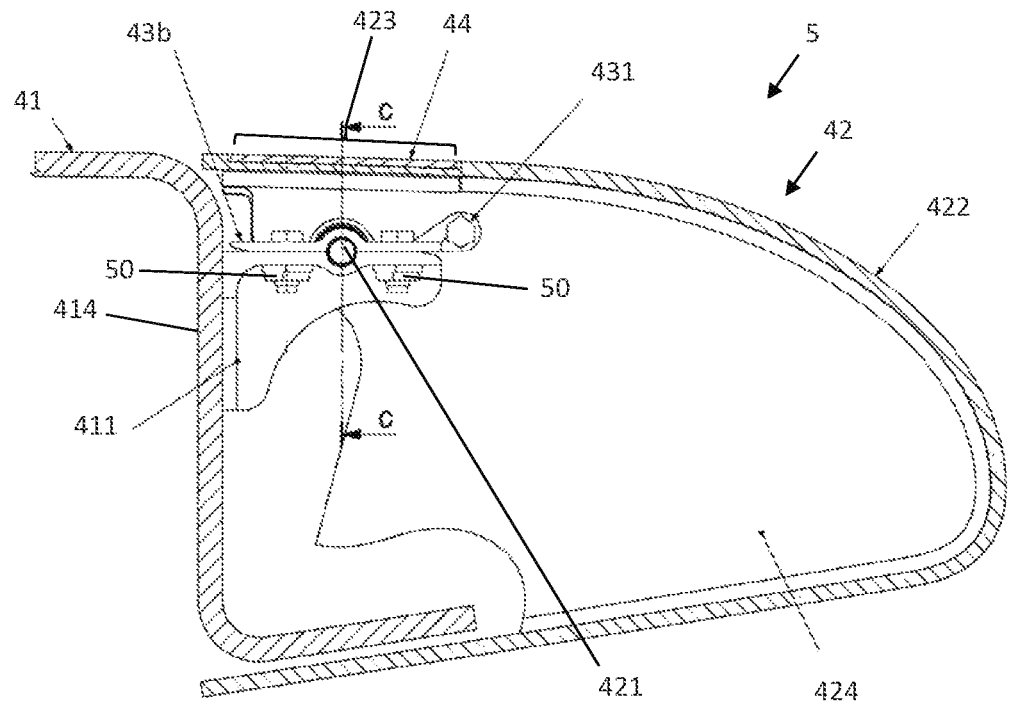
FIGS. 5a-d are various views of an example aerofoil structure formed from the kit of parts of FIGS. 4a-d.
Figure 5B:
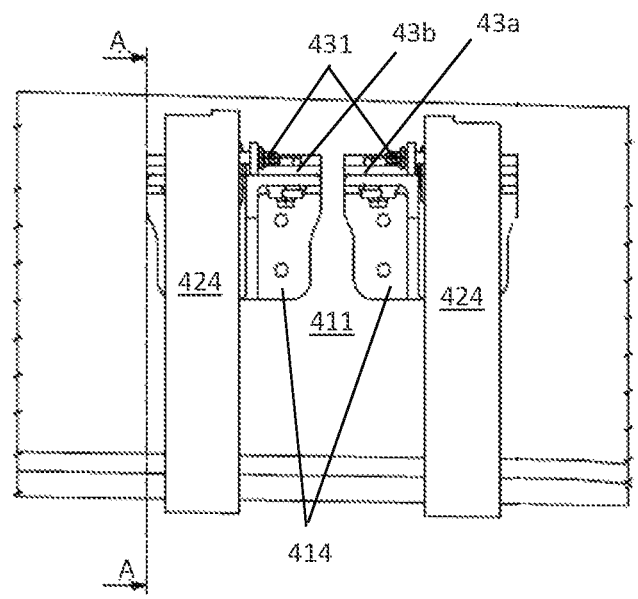
Figure 5C:
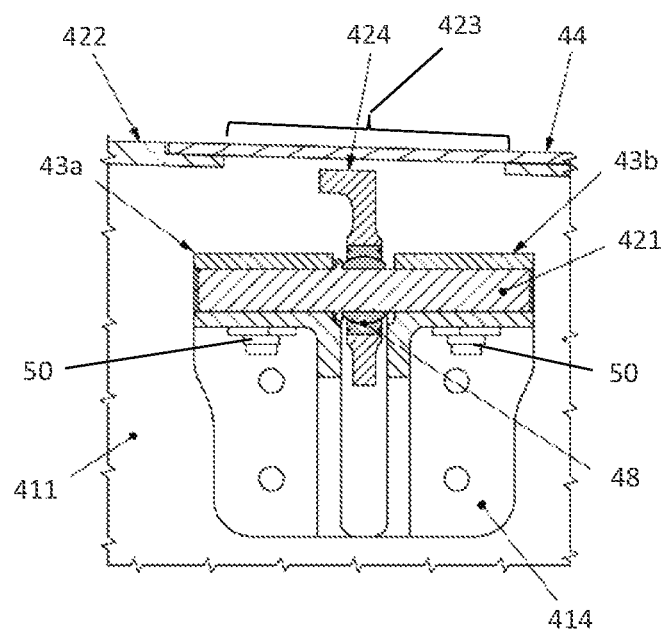
Figure 5D:
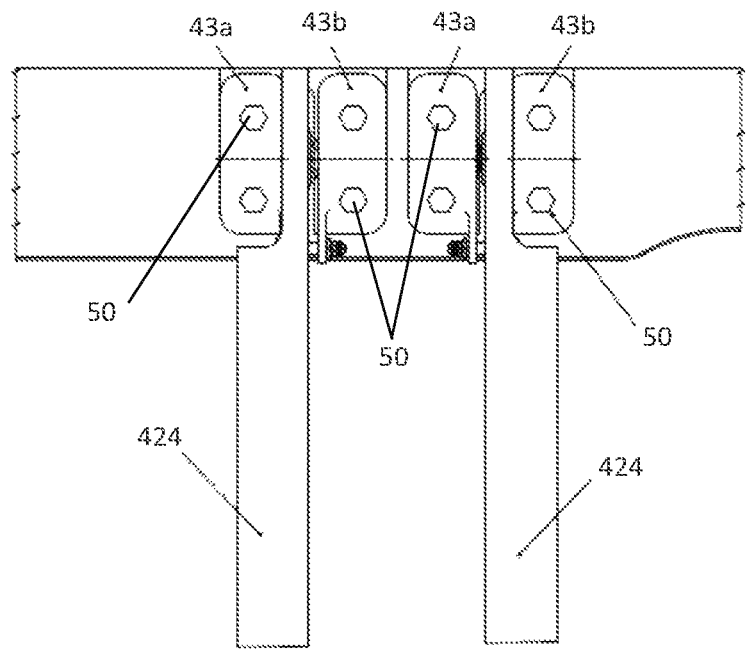

Assembly of the kit of parts 4 results in the aerofoil structure 5, shown in FIGS. 5a-d. FIG. 5b is a front view of the aerofoil structure 5, with the outer skin of the fixed leading edge structure 42 omitted for clarity. FIG. 5a is a cross-section through the line A-A of FIG. 5b. FIG. 5c is a cross-section through the line C-C of FIG. 5a. FIG. 5d is a partial top view of the aerofoil structure 5, with the outer skin 422 omitted. FIGS. 5a and 5c show the outer skin 422 of the fixed leading edge structure 42. The outer skin 422 comprises an opening 423, which is closed by a cover panel 44. The opening 423 and the cover panel 44 may have any of the same features as the opening 323 and cover panel 34 of the example kit of parts 3 described above. It can be seen from FIG. 5c that the pin 421 comprises a collar formation 52, which functions to prevent axial movement of the pin 421 relative to the fitting 411.

Example kits of parts which comprise fixed leading or trailing edge structures and torsion boxes having first and second mounting features like those illustrated by FIG. 3, FIGS. 4a-d and FIGS. 5a-d confer various advantages. For example, they facilitate attaching a leading or trailing edge structure to an aircraft torsion box after aircraft systems (that is, leading edge or trailing edge systems) have been installed in the leading or trailing edge structure. With conventional attachment techniques, this is problematic because it involves drilling fastener holes into the leading/trailing edge structure with the leading/trailing edge structure already arranged in its intended final position adjacent the torsion box, and with the aircraft systems already present in that leading/trailing edge structure. This is because the fastener holes should be created through the wing box and leading/trailing edge structure simultaneously, to ensure correct alignment of the holes. However; creating the holes after the leading or trailing edge structure has been fully assembled and aircraft systems have been installed therein is disadvantageous because dust generated by the hole creation process can contaminate the interior of the leading or trailing edge structure, and the systems contained within.

Example kits of parts of the general type described above can avoid this issue because the mounting features on the leading/trailing edge structure and the torsion box can be manufactured and positioned on the respective components to be attached together with a high degree of accuracy. This means that a fixed leading/trailing edge structure can be attached to a torsion box by positioning the fixed leading/trailing edge structure adjacent the torsion box, engaging the first mounting features with the second mounting features such that the fixed leading/trailing edge structure is supported and retained on the torsion box, and then applying locking components to lock each respective pair of first and second mounting features into engagement with each other. Any required holes can be created during the manufacture of the individual parts comprised in a kit of parts, and any dust created can be removed before aircraft systems are installed. These advantages of example kits of parts according to the invention also facilitate the use of interchangeable modular fixed leading/trailing edge structures.

Figure 6:
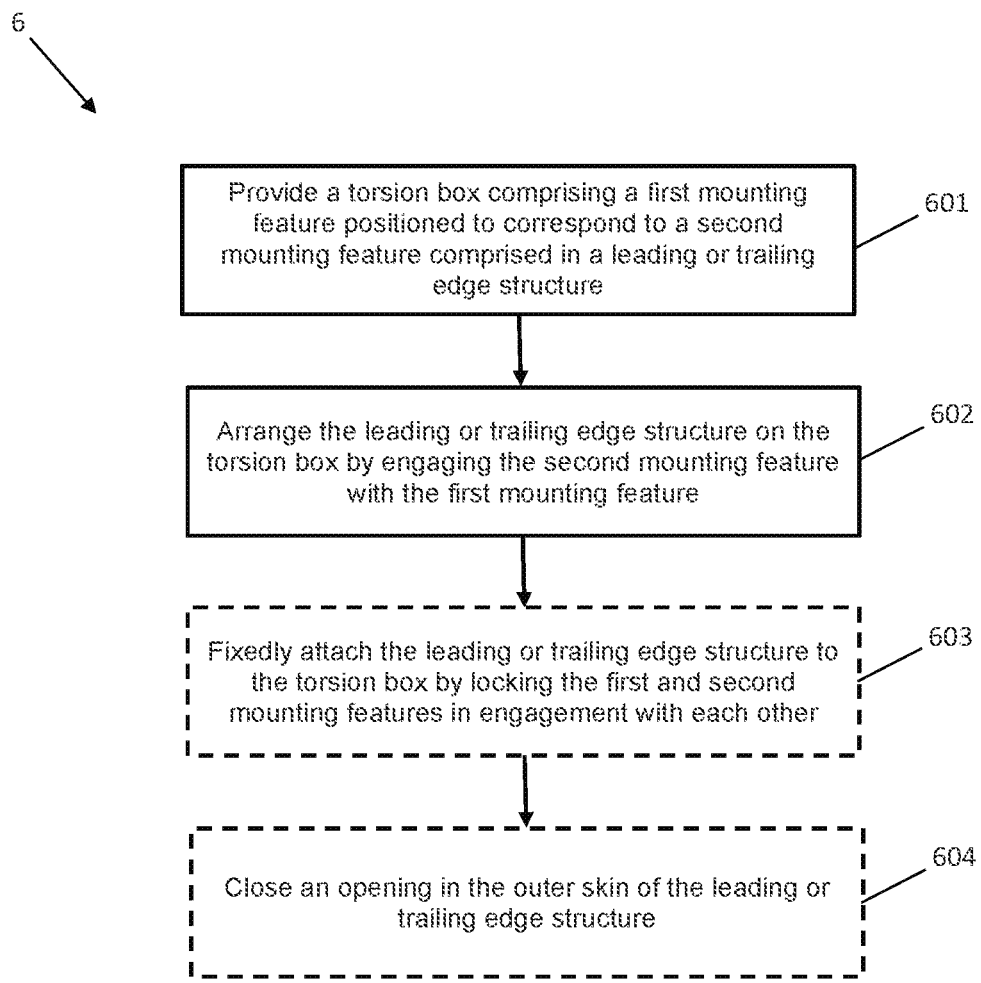
FIG. 6 is a flow chart of an example method for use in assembling an aerofoil structure.

As mentioned above, the examples according to the invention can facilitate advantageous methods of manufacturing/assembling an aerofoil structure. FIG. 6 is a flow chart that implements an example method 6 for use in assembling an aerofoil structure. Performing the method 6 may comprise assembling a kit of parts according to the invention. Although the method 6 is described primarily with reference to the particular kit of parts 4, the method 6 may be performed using any kit of parts according to the invention, and the parts referred to may have any of the features described above in relation to the parts of any of the example kits of parts 3 and 4.

In a first block 601 a torsion box is provided. The torsion box comprises a first mounting feature positioned to correspond to a second mounting feature comprised in a leading or trailing edge structure of the aerofoil structure being assembled. The torsion box may have any or all of the features of the example torsion boxes 31, 41 described above. The leading or trailing edge structure may have any or all of the features of the example fixed leading edge structures 32, 42 described above. The first and second mounting features may have any or all of the features of the example first and second mounting features 311, 321, 411, 421 described above. Providing the torsion box may comprise supporting the torsion box in a desired position and/or orientation, for example using a jig.

In block 602 the leading or trailing edge structure is arranged on the torsion box by engaging the second mounting feature with the first mounting feature. The first and second mounting features are mutually configured to permit the second mounting feature to be brought into engagement with the first mounting feature by moving the second mounting feature toward the first mounting feature along a first axis. The leading or trailing edge structure may comprise one or more systems for actuating a moveable device comprised in or mountable to the aerofoil structure. In examples relating to the kit of parts 4, engaging the second mounting feature with the first mounting feature may comprise positioning the fixed leading edge structure 42 and the torsion box 41 such that the pins 421 are aligned with and directly above their corresponding recesses 45 in the fittings 411. The first axis may be substantially vertical with respect to an intended operational orientation of the aerofoil structure. The first axis may be substantially perpendicular to the interface surfaces of the fittings 411 (i.e. the first axis is substantially perpendicular to the interface surfaces of the fittings 411). Such a direction may be substantially parallel to the minor axis of the web of the spar 414. Engaging the second mounting feature with the first mounting feature may comprise each recess 45 of a fitting 411 receiving a lower part of a pin 421. Performing block 602 may comprise engaging multiple pairs of first and second mounting features with each other simultaneously. The leading or trailing edge structure may be supported and moved in any suitable manner during the performance of block 602, such as using a moveable jig, or manually by aircraft assembly personnel.

The first and second mounting features are further mutually configured to substantially prevent relative movement of the first and second mounting features along a second axis when the second mounting feature is engaged with the first mounting feature. The second axis has a component perpendicular to the first axis. The second axis may be substantially parallel to a chord of the aerofoil structure. This function of the first and second mounting features advantageously enables the leading or trailing edge structure to be supported and retained on the torsion box solely by the engagement of the first and second mounting features. Any jigs or other support mechanisms used to support the leading or trailing edge structure may therefore be removed upon completion of block 602. In examples in which the leading or trailing edge structure is manually arranged on the torsion box, no jig may be required in respect of the leading or trailing edge structure.

In a further optional block 603, the leading or trailing edge structure is fixedly attached to the torsion box by locking the first and second mounting features in engagement with each other such that relative movement of the first and second mounting features along the first axis is substantially prevented. Such locking may be performed in respect of each pair of first and second mounting features comprised in the kit of parts. The relative movement of the leading or trailing edge structure and the torsion box along all directions except parallel to the major axis of the torsion box may be prevented by the locking. In some examples the locking of the first and second mounting features in engagement may also substantially prevent relative movement of the first and second mounting features along an axis parallel to the major axis of the torsion box. Performing block 603 may comprise fixedly attaching a locking component (which may have any or all of the features of the example locking components 33, 43a, 43b) to the first mounting feature.

Attachment of such a locking component may be done in any of the manners described above in relation to the example locking components 33, 43*a*, 43*b*. Performing block 603 may comprise accessing at least one of the first and second mounting features through an opening in an outer skin of the leading or trailing edge structure. For example, the locking component and/or fasteners for attaching the locking component to the first mounting feature may be inserted through the opening. A tool for tightening a fastener for attaching the locking component to the first mounting feature may be inserted through the opening. Substantially all of the weight of the leading or trailing edge structure may be supported by the first mounting feature, and optionally one or more further first mounting features comprised in the torsion box, during the step of fixedly attaching the leading or trailing edge structure to the torsion box.

In examples in which a locking component is used to fixedly attach the leading or trailing edge structure to the torsion box, and is accessed through an opening in the outer skin of the leading or trailing edge structure, a further optional block 604 may be performed. In block 604, the opening in the outer skin of the leading or trailing edge structure is closed. Closing the opening may comprise creating a continuous aerodynamic surface across a region of the leading or trailing edge structure which encompasses the opening. For example, the opening may be closed by installing a cover panel in or over the opening. The cover panel may have any or all of the features of the example cover panels 34, 44 described above. The cover panel may be attached to the leading or trailing edge structure by any suitable mechanism such as fasteners, a bonding agent, or the like. Block 604 may be performed in respect of each opening in the leading or trailing edge structure, if multiple such openings exist.

The example method enables systems to be installed in the leading or trailing edge structure prior to it being attached to the torsion box, and may also minimise or eliminate the need to drill or otherwise create any fastener holes (or other mounting holes) at a relatively late stage of the aerofoil structure assembly process. Instead, all such features can be created during initial manufacture/assembly of the torsion box and of the leading or trailing edge structure. Contamination of these structures and any aircraft systems contained therein can thereby be avoided. Furthermore, the example method is suitable for use in attaching and interchanging modular leading or trailing edge structures to a torsion box.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. While at least one exemplary embodiment of the present invention(s) is disclosed herein, it should be understood that modifications, substitutions and alternatives may be apparent to one of ordinary skill in the art and can be made without departing from the scope of this disclosure.

In this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A kit of parts for forming an aerofoil structure, the kit of parts comprising:
a torsion box comprising a first mounting feature configured to attach a fixed leading edge structure or a fixed trailing edge structure to the torsion box; and
the fixed leading edge structure or fixed trailing edge structure comprising a second mounting feature configured to engage with the first mounting feature;
wherein the first mounting feature includes a fitting extending from the torsion box in a chordwise direction of the torsion box, and the fitting includes a groove oriented in a spanwise direction;
wherein the second mounting feature includes a pin mounted to the leading edge structure or the fixed trailing edge structure, and the pin is configured to seat in the groove of the first mounting feature, and
wherein the first mounting feature and the second mounting feature, while the pin is seated in the groove, are mutually configured to permit the first and second mounting features to be moved into engagement with each other along a first direction, and simultaneously to prevent relative movement of the first and second mounting features both forward and aft along a chordwise direction when the first and second mounting features are engaged with each other, and wherein the first direction is a vertical direction, with respect to an intended operational orientation of the aerofoil structure.

2. The kit of parts according to claim 1, further comprising a locking component configured to prevent disengagement of the second mounting feature from the first mounting feature, wherein the locking component is configured to prevent relative movement of the first and second mounting features along the first direction when the first and second mounting features are engaged with each other.

3. The kit of parts according to claim 1, wherein the fixed leading or trailing edge structure comprises an outer skin having an opening configured to permit access to the second mounting feature through the opening, and further comprising a cover panel configured to close the opening, wherein the cover panel is configured such that the cover panel and the outer skin form a smooth aerodynamic surface when the cover panel is closing the opening.

4. The kit of parts according to claim 1, wherein the torsion box comprises a spar and the first mounting feature comprises a fitting fixedly attached to a web part of the spar and extends outwardly from the web part of the spar.

5. The kit of parts according to claim 4, wherein the second mounting feature comprises a pin mounted to a rib of the fixed leading or trailing edge structure and oriented to be parallel to a major axis of the torsion box when the fixed leading or trailing edge structure is attached to the torsion box.

6. The kit of parts according to claim 5, wherein the pin is mounted to the fixed leading or trailing edge structure by a spherical bearing, such that the orientation of the pin relative to the fixed leading or trailing edge structure is adjustable.

7. The kit of parts according to claim 5, wherein the fitting comprises a first interface surface defining a recess configured to receive the pin and to prevent movement of the pin along the chordwise direction when the pin is received in the recess.

8. The kit of parts according to claim 7, wherein the cross-sectional shape of the recess is configured to match the cross-sectional shape of the pin.

9. The kit of parts according to claim 1, wherein the torsion box comprises one or more further first mounting features and the fixed leading or trailing edge structure further comprises one or more further second mounting features, wherein the first mounting features are spaced along the torsion box in the spanwise direction according to a predetermined arrangement corresponding to an arrangement of the second mounting features on the fixed leading or trailing edge structure.

10. The kit of parts according to claim 1, wherein the fixed leading or trailing edge structure is of a modular design.

11. A kit of parts comprising:
a torsion box comprising a first mounting feature configured to attach a fixed leading edge structure or a fixed trailing edge structure to the torsion box;
   wherein the fixed leading edge structure or fixed trailing edge structure comprising a second mounting feature configured to engage with the first mounting feature:
   wherein the first mounting feature and the second mounting feature are mutually configured to permit the first and second mounting features to be moved into engagement with each other along a first direction, and to prevent relative movement of the first and second mounting features along a second direction when the first and second mounting features are engaged with each other;
   wherein the first direction is a vertical direction, with respect to an intended operational orientation of the aerofoil structure, and the second direction is a chordwise direction;
   wherein the torsion box comprises a spar and the first mounting feature comprises a fitting fixedly attached to a web part of the spar and extends outwardly from the web part of the spar;
   wherein the second mounting feature comprises a pin mounted to a rib of the fixed leading or trailing edge structure and oriented to be parallel to a major axis of the torsion box when the fixed leading or trailing edge structure is attached to the torsion box;
a first interface surface defining a recess configured to receive the pin and to prevent movement of the pin along the second direction when the pin is received in the recess; and
a clamp plate configured to prevent disengagement of the second mounting feature from the first mounting feature, wherein the clamp plate is configured to prevent relative movement of the first and second mounting features along the first direction when the first and second mounting features are engaged with each other, and wherein the clamp plate comprises a second interface surface configured to cooperate with the first interface surface and an outer surface of the pin, when the pin is received in the recess of the first interface surface, to prevent movement of the pin away from the fitting along the first direction.

12. The kit of parts according to claim 11, wherein the fixed leading or trailing edge structure comprises an outer skin having an opening configured to permit access to the second mounting feature through the opening, and wherein the clamp plate is configured to be fastened to the fitting by fasteners accessible through the opening.

13. An aerofoil structure formed from the kit of parts according to claim 1.

14. The aerofoil structure according to claim 13, wherein the aerofoil structure is an aircraft wing.

15. An assembly comprising:
a torsion box for an aerodynamic structure of an aircraft;
a first mounting fitting configured to be fixed to a web portion of a spar of the torsion box, wherein the first mounting fitting extends from the spar in a chordwise direction of the torsion box, and the first mounting fitting includes a groove oriented in a spanwise direction;
a leading edge structure or trailing edge structure fixed to the torsion box; and
a second mounting pin mounted to a rib of the leading edge structure or fixed trailing edge structure, and
wherein the first mounting fitting and the second mounting pin engage to simultaneously permit the second mounting pin to move vertically to seat in the groove of the first mounting fitting, and to prevent relative movement of the first mounting fitting and second mounting pin both forward and aft along the chordwise direction.

16. The assembly of claim 15, further comprising:
a clamp plate configured to attach to the first mounting fitting and overlay the groove, wherein the clamp plate includes a recess to receive the sound mounting pin, wherein the clamp plate, when attached to the first mounting fitting, prevents vertical movement of the second mounting pin with respect to the first mounting fitting.

* * * * *